(12) United States Patent
Alcaraz

(10) Patent No.: US 9,470,905 B1
(45) Date of Patent: Oct. 18, 2016

(54) GLIDER EYEGLASS COMFORT SYSTEM

(71) Applicant: Daniel G. Alcaraz, Downey, CA (US)

(72) Inventor: Daniel G. Alcaraz, Downey, CA (US)

( * ) Notice: Subject to any disclaimer, the term of this patent is extended or adjusted under 35 U.S.C. 154(b) by 0 days.

(21) Appl. No.: 14/639,455

(22) Filed: Mar. 5, 2015

Related U.S. Application Data

(60) Provisional application No. 61/948,100, filed on Mar. 5, 2014.

(51) Int. Cl.
*G02C 5/14* (2006.01)
*G02C 3/00* (2006.01)
*G02C 11/00* (2006.01)

(52) U.S. Cl.
CPC .............. *G02C 3/003* (2013.01); *G02C 11/00* (2013.01); *G02C 2200/18* (2013.01)

(58) Field of Classification Search
CPC ............. G02C 5/06; G02C 5/14; G02C 5/16
USPC ................... 351/123, 111, 121, 122, 41, 158
See application file for complete search history.

(56) References Cited

U.S. PATENT DOCUMENTS

| | | | |
|---|---|---|---|
| 5,422,685 A | 6/1995 | Conway | |
| 8,152,298 B2 | 4/2012 | Frank | |
| 8,454,158 B2 * | 6/2013 | Dillard | G02C 11/10 351/123 |
| 2006/0077339 A1 | 4/2006 | Jamie | |

* cited by examiner

*Primary Examiner* — Hung Dang
(74) *Attorney, Agent, or Firm* — RG Patent Consulting, LLC; Rachel Gilboy

(57) ABSTRACT

A device that shifts some weight of eyeglasses from the bridge of a wearer's nose to the wearer's ears using a pair of novel glider comfort assemblies and a pair of flexible plastic semi-circular pieces that are placed on the ears of the wearer. Use of this device may avoid headaches and prevent discomfort such as nasal congestion and other maladies that can result directly from the eyeglass placing undo pressure on the bridge of the nose.

20 Claims, 5 Drawing Sheets

GLIDER EYEGLASS COMFORT SYSTEM

CROSS-REFERENCE TO RELATED APPLICATION

The present application is related to and claims priority from prior provisional application Ser. No. 61/948,100, filed Mar. 5, 2014 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of eyeglass accessories and more specifically relates to a glider eyeglass comfort system.

2. Description of the Related Art

As early as the 13th century, man has worn eyeglasses to correct problems associated with poor vision. A crude but effective means of improving eyesight, the first eyeglasses were nonetheless far superior to earlier methods of vision enhancement, which included such practices as peering through a magnifying glass, holding a polished stone over the eye, or even reading text by looking through a filled glass of water. With the introduction of concave lenses in the early 16th century, the chances for a nearsighted person to see more clearly, vastly improved. A favorite of Pope Leo X, these early glasses were far better than those which came before and offered nearsighted persons their first opportunity to see objects at a distance. By 1629, the first ever spectacle company was started in England. Still a far cry from the glasses worn today, eyeglasses manufactured in the 17th century were made of quartz and were set into bone, metal or leather mountings.

Shaped like two small magnifying glasses, these simple eyeglasses were held together by an inverted V-shaped handle, which was designed to balance precariously on the bridge of the nose. Today, eyeglasses lenses are mostly manufactured from plastic, optical glass or polycarbonate material and are used to improve nearsightedness, farsightedness, astigmatism and presbyopia. Worn by millions of Americans, eyeglasses frames are most typically made from drawn wire or lightweight, plastic material and are held in place in front of the wearer's eyes via two, extension arms which rest atop either ear, as well as a simple bridge with two, integrated nose pads, which sit firmly atop the wearer's nose. Providing those who suffer from poor vision an effective means of seeing clearly, eyeglasses are truly a revolutionary invention.

While the practicality and usefulness of eyeglasses can never be disputed, most consumers would agree that wearing eyeglasses is not without one major drawback. Specifically, many eyeglass wearers find that because eyeglasses rest directly on the nose, the weight of the eyeglasses can cause discomfort. With the weight of the eyeglasses resting firmly atop the nose, wearing eyeglasses for extended periods can result in pressure to this area and can cause one to suffer a variety of associated maladies. Specifically, for those who suffer migraines, the concentrated weight of the eyeglasses on the bridge of the nose can lead one to experience headache symptoms. Further, the actual nose pads utilized to support the eyeglasses can actual pinch the nose, compressing the sinus passages and restricting one's airways.

As can be imagined, suffering a horrible migraine or dealing with a stuffed nose, simply because one is required to wear eyeglasses to comfortably see, can be extremely challenging. As many consumers would attest, purchasing an expensive pair of eyeglasses or sunglasses, only to find that they cause discomfort can be a very frustrating experience. This is not desirable.

Various attempts have been made to solve the above-mentioned problems such as those found in U.S. Pat. No. 5,422,685 to Simon M. Conway; U.S. Pub No. 2006/0077339 to Shahrooz S. Jamie, et al; and U.S. Pat. No. 8,152,298 to James Frederick Frank. This art is representative of eyeglass accessories. None of the above inventions and patents, taken either singly or in combination, is seen to describe the invention as claimed.

Ideally, a glider eyeglass comfort system should provide an eyeglass accessory to help redistribute the weight of eyeglasses from the nose to alleviate pressure on nasal cavities and the bridge of a nose, thus ensuring a more comfortable fit while also preventing nasal congestion, migraine headaches, and other medical maladies that can directly result from the pressure to the nose created by eyewear and, yet would operate reliably and be manufactured at a modest expense. Thus, a need exists for a reliable glider eyeglass comfort system to avoid the above-mentioned problems.

BRIEF SUMMARY OF THE INVENTION

In view of the foregoing disadvantages inherent in the known eyeglass accessories art, the present invention provides a novel glider eyeglass comfort system. The general purpose of the present invention, which will be described subsequently in greater detail, is to provide a device to adjust the positioning of a pair of eyeglasses on the face of a user to relieve the weight and pressure from a nose of the user and shift the weight to the ears of the user.

A glider eyeglass comfort system is disclosed herein, in a preferred embodiment, comprising a pair of glider-comfort-assemblies and a pair of structurally arranged arcuate-male-adjustment-members. Each glider-comfort-assembly, comprising a structurally arranged first-glider-comfort-assembly and a structurally arranged second-glider-comfort-assembly, has a temple-piece-receiver and an arcuate-female-receiver. The pair of arcuate-male-adjustment-members comprises a first arcuate-male-adjustment-member and a second arcuate-male-adjustment-member.

The first-glider-comfort-assembly and the second-glider-comfort-assembly each comprise soft pliable clear material able to allow each of the temple-pieces of a pair of eyeglasses to be removably inserted into and through the (respective) temple-piece-receiver of the first-glider-comfort-assembly and the temple-piece-receiver of the second-glider-comfort-assembly. Both the first-glider-comfort-assembly and the second-glider-comfort-assembly comprise a length sufficient for stabilizing each of the glider-comfort-assemblies on each of the temple-pieces of the eyeglasses when the glider-comfort-assembly is in use, and a glider-height sufficient for containing the temple-piece-receiver and the arcuate-female-receiver. Each of the first-glider-comfort-assembly and the second-glider-comfort-assembly is able to be adjusted on each of the temple-pieces of the eyeglasses by independently sliding the first-glider-comfort-assembly and the second-glider-comfort-assembly forward and backward on the temple-pieces of the eyeglasses.

Each of the arcuate-female-receivers (respectively) comprises a set of first-teeth having approximately twenty-four first-teeth evenly spaced along a length of the arcuate-female-receiver of the first-glider-comfort-assembly and the length of the arcuate-female-receiver of the second-glider-comfort-assembly. Each set of (respective) first-teeth preferably comprises soft flexible material fixedly attached to an inside-top-edge of the arcuate-female-receiver of the first-glider-comfort-assembly and the inside-top-edge of the arcuate-female-receiver of the second-glider-comfort-assembly.

Each of the arcuate-male-adjustment-members, comprising a substantially semi-circle curvature with an approximate two inch diameter, is able to be removably placed adjacent the (respective) ear of the user and fit snugly around each of the ears at a juncture between the ears and the scalp of the user. The arcuate-male-adjustment-members comprise light-weight clear plastic flexible material of sufficient flexibility for a section of each arcuate-male-adjustment-member to substantially straighten out as each of the arcuate-male-adjustment-members is inserted into each of the arcuate-female-receivers. Each of the (respective) arcuate-male-adjustment-members further comprise a set of second-teeth having approximately forty second-teeth comprising soft flexible material fixedly attached and evenly spaced along the length of the top-edge of the first-arcuate-male-adjustment-member and along the length of the top-edge of the second-arcuate-male-adjustment-member. The second-teeth allow an incremental adjustment means when used in conjunction with the sets of first-teeth as they mesh and align with each other.

Each of the arcuate-male-adjustment-members is able to be inserted into each of the arcuate-female-receivers as the arcuate-female-receivers adjustably receive the arcuate-male-adjustment-members. The arcuate-male-adjustment-members substantially straighten as they enter the arcuate-female-receivers while each set of first-teeth interacts and aligns with each set of second-teeth to provide arcuate adjustment. The user is able to adjust the positioning of the eyeglasses by manipulating the eyeglasses via meshing each of the sets of first-teeth on the arcuate-female-receivers with each set of second-teeth on the arcuate-male-adjustment-members to achieve a desired placement of the eyeglasses on the head of the user.

When in use the user is able to removably place each of the temple-piece-receivers on each of the (respective) temple-pieces of the eyeglasses via the temple-piece-receivers, and place each of the arcuate-male-adjustment-members (respectively) into each of the arcuate-female-receivers. The user then places each of the arcuate-male-adjustment-members on respective ears and manipulately aligns the positioning of the first-teeth and the second-teeth to relieve pressure of a nose-piece of the eyeglasses on a nose by shifting weight of the eyeglasses to the ears of the user as desired.

The present invention holds significant improvements and serves as a glider eyeglass comfort system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, a glider eyeglass comfort system constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to an eyeglass accessory and more particularly to a glider eyeglass comfort system as used to improve the ability to adjust the position of a pair of eyeglasses on the face of a user to relieve the weight and pressure from a nose of the user and shift the weight to the ears of the user.

Generally speaking, a glider eyeglass comfort system is a device to help improve the overall health of anyone using eyeglasses, especially those with heavier glass that include thicker, heavier lenses and thicker, heavier earpieces. The glider eyeglass comfort system shifts weight of the eyeglasses from the bridge of a wearer's nose to the wearer's ears. By shifting this weight, the wearer may avoid headaches and prevent discomfort such as nasal congestion and other maladies that can result directly from placing the weight of eyeglasses on the bridge of the nose.

Glider eyeglass comfort system includes a pair of glider comfort assemblies designed to be placed on the earpieces of the eyeglasses. Also included is a pair of flexible plastic semi-circular pieces that are mountable to the wearer's ears. Two sets of soft, flexible teeth align and mesh together allowing the weight of the eyeglasses to be shifted from the bridge of the nose to the wearer's ears.

Figure 1:
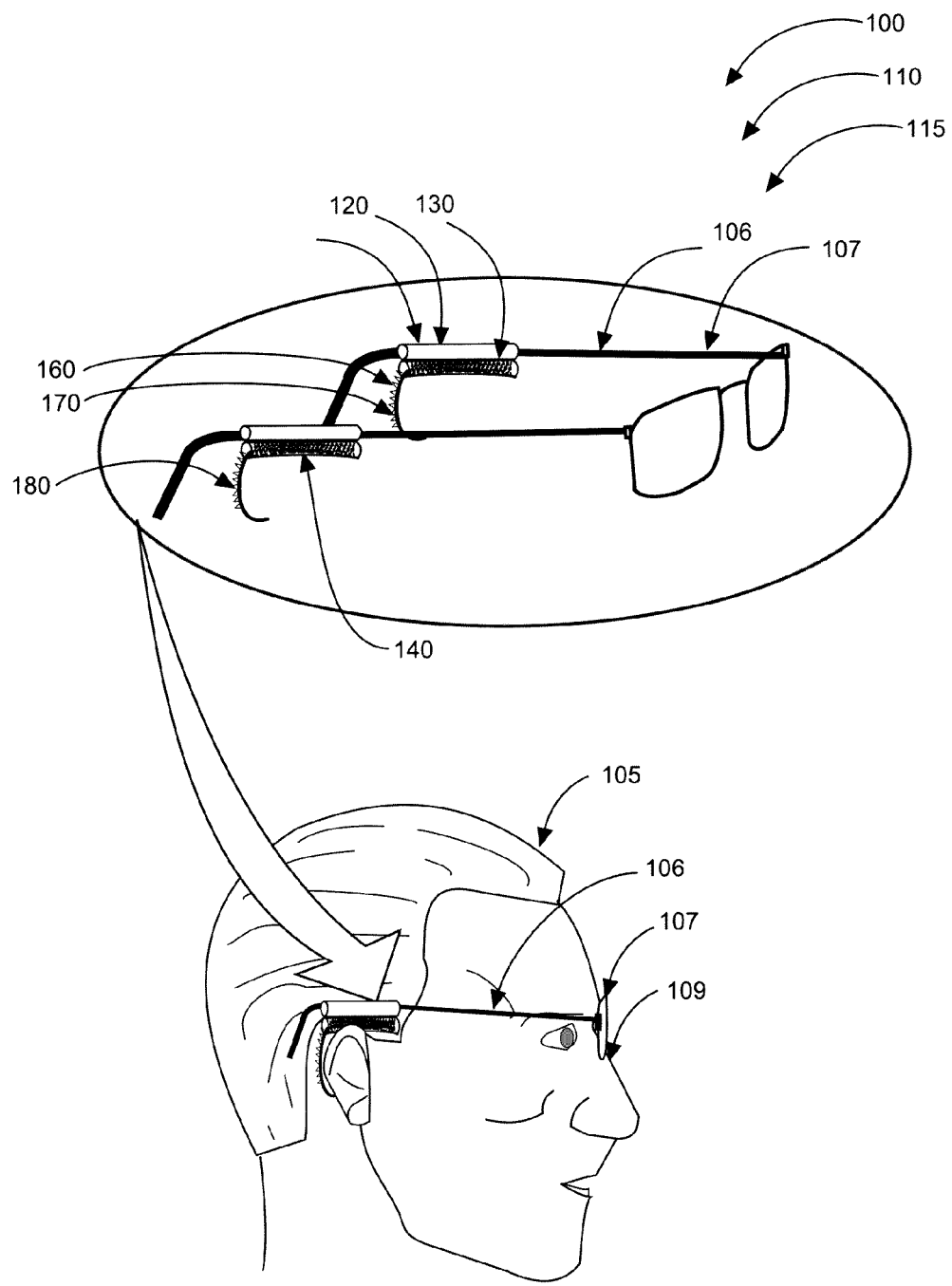
FIG. 1 shows a perspective view illustrating a glider eyeglass comfort system in an in-use condition according to an embodiment of the present invention.

Referring now to the drawings by numerals of reference there is shown in FIG. 1, a perspective view illustrating glider eyeglass comfort system 100 in an in-use condition 150 according to an embodiment of the present invention.

Glider eyeglass comfort system 100 comprises pair of glider-comfort-assemblies 110 and pair of structurally arranged arcuate-male-adjustment-members 160. Glider-comfort-assembly 110, comprising structurally arranged first-glider-comfort-assembly 115 and structurally arranged second-glider-comfort-assembly 140, has temple-piece-receiver 120 able to fit on standard size temple-pieces 106 of eyeglasses 107 and arcuate-female-receiver 130 having set of first-teeth 133. Pair of arcuate-male-adjustment-members 160 having set of second-teeth 168 comprises first arcuate-male-adjustment-member 170 and second arcuate-male-adjustment-member 180. In alternate embodiments temple-piece-receivers 120 would be available in sizes to fit smaller temple-pieces 106 and larger temple-pieces 106.

Glider eyeglass comfort system 100 in the preferred embodiment comprises a pair of structures to be used with a manufactured pair of eyeglasses 107. In an alternate embodiment glider eyeglass comfort system 100 is incorporated into the design and manufacturing of eyeglasses 107.

When in use, user 105 is able to removably (respectively) place each of temple-piece-receivers 120 on each of temple-pieces 106 of eyeglasses 107 via temple-piece-receivers 120, and place each of arcuate-male-adjustment-members 160 (respectively) into each of arcuate-female-receivers 120. User 105 then places each of arcuate-male-adjustment-members 160 on respective ears 108 and manipulately aligns the positioning of first-teeth 135 and second-teeth 165 to relieve pressure of nose-piece 108 of eyeglasses 107 on nose 109 by shifting weight of eyeglasses 107 to ears 108 of user 105 as desired.

Figure 2:
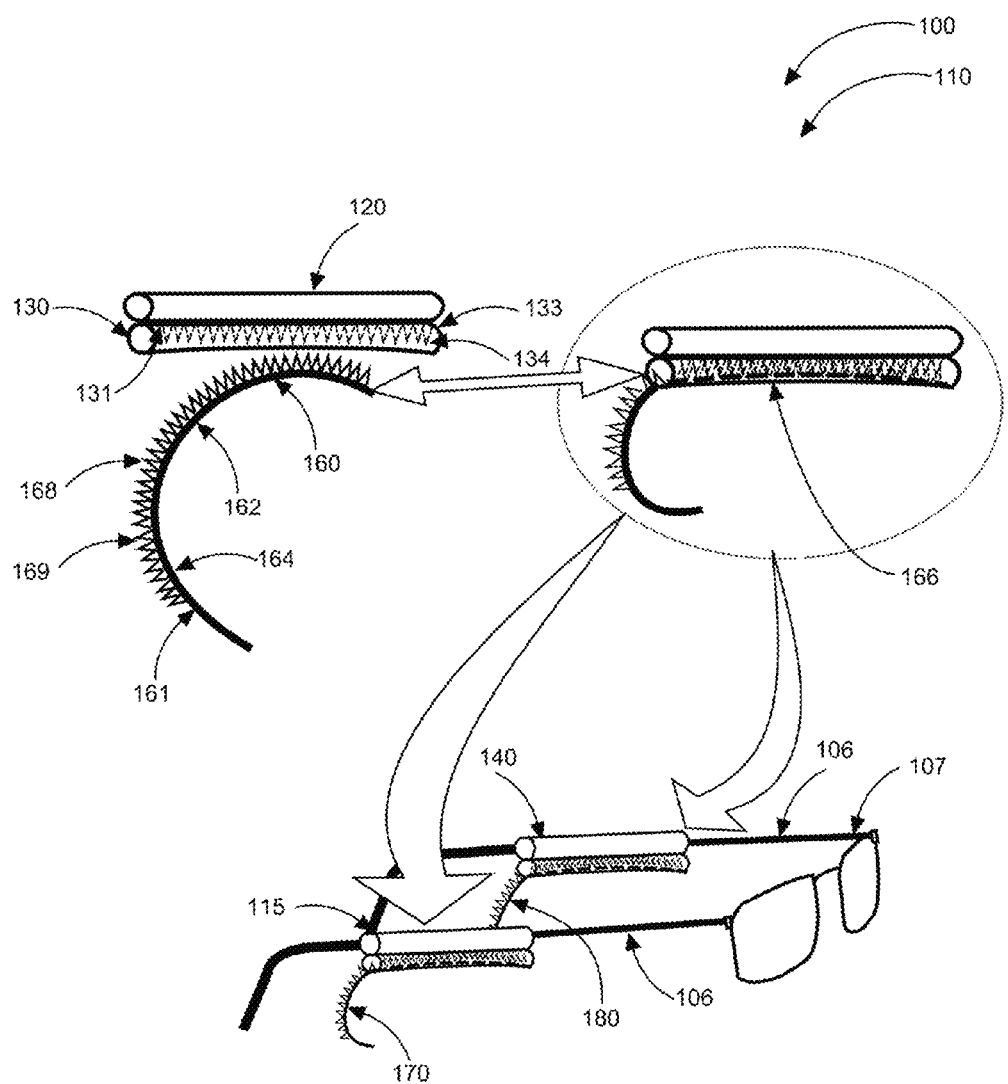
FIG. 2 is a perspective view illustrating a glider eyeglass comfort system according to an embodiment of the present invention of FIG. 1.

Referring now to FIG. 2, a perspective view illustrating glider eyeglass comfort system 100 according to an embodiment of the present invention of FIG. 1.

First-glider-comfort-assembly 115 and second-glider-comfort-assembly 140 each comprise soft pliable clear material able to allow each of temple-pieces 106 of pair of eyeglasses 107 to be removably inserted into and through temple-piece-receiver 120 of first-glider-comfort-assembly 115 and temple-piece-receiver 120 of second-glider-comfort-assembly 140 (respectively). Each first-glider-comfort-assembly 115 and second-glider-comfort-assembly 140 comprise a length sufficient for stabilizing each of glider-comfort-assemblies 110 on each of temple-pieces 106 of eyeglasses 107 when glider-comfort-assembly 110 is in use, and a height and depth sufficient for containing temple-piece-receivers 120 and arcuate-female-receiver 130. Each of first-glider-comfort-assembly 115 and second-glider-comfort-assembly 140 is able to be adjusted on each of temple-pieces 106 of eyeglasses 107 by independently sliding first-glider-comfort-assembly 115 and second-glider-comfort-assembly 140 forward and backward on temple-pieces 106 of eyeglasses 107.

Each of arcuate-male-adjustment-members 160 is able to be inserted (respectively) into respective arcuate-female-receivers 130 as arcuate-female-receivers 130 adjustably receive arcuate-male-adjustment-members 160. Arcuate-male-adjustment-members 160 substantially straighten as they enter arcuate-female-receivers 130 while each set of first-teeth 133 interacts and aligns with each set of second-teeth 168 to provide arcuate adjustment. User 105 is able to adjust the positioning of eyeglasses 107 by manipulating eyeglasses 107 via meshing each of sets of first-teeth 133 on arcuate-female-receivers 130 with each set of second-teeth 168 on arcuate-male-adjustment-members 160 to achieve a desired placement of eyeglasses 107 on the head of user 105.

Each of arcuate-female-receivers 130 comprises set of first-teeth 133 having approximately twenty-four first-teeth 134 evenly spaced along a length of arcuate-female-receiver 130 of first-glider-comfort-assembly 115 and the length of arcuate-female-receiver 130 of second-glider-comfort-assembly 140. Each set of first-teeth 113 comprises soft flexible material fixedly attached to inside-top-edge 131 of arcuate-female-receiver 130 of first-glider-comfort-assembly 115 and inside-top-edge 131 of arcuate-female-receiver 130 of second-glider-comfort-assembly 140.

Each of arcuate-male-adjustment-members 160, comprising substantially semi-circle curvature 162 with approximate two inch diameter 164, is able to be removably placed adjacent (respective) ears 108 of user 105 and fit snugly around each of ears 108 at a juncture between ears 108 and the scalp of user 105. Arcuate-male-adjustment-members 160 comprise light-weight clear plastic flexible material of sufficient flexibility for section 166 of each arcuate-male-adjustment-member 160 to substantially straighten out as each of arcuate-male-adjustment-members 160 is inserted into each of arcuate-female-receivers 130. Each of arcuate-male-adjustment-members 160 further comprise set of second-teeth 168 having approximately forty second-teeth 169 comprising soft flexible material fixedly attached and evenly spaced along the length of top-edge 161 of first-arcuate-male-adjustment-member 170 and along the length of top-edge 161 of second-arcuate-male-adjustment-member 180. Sets of second-teeth 168 allow an incremental adjustment means when used in conjunction with sets of first-teeth 133 as they mesh and align with each other.

Figure 3:
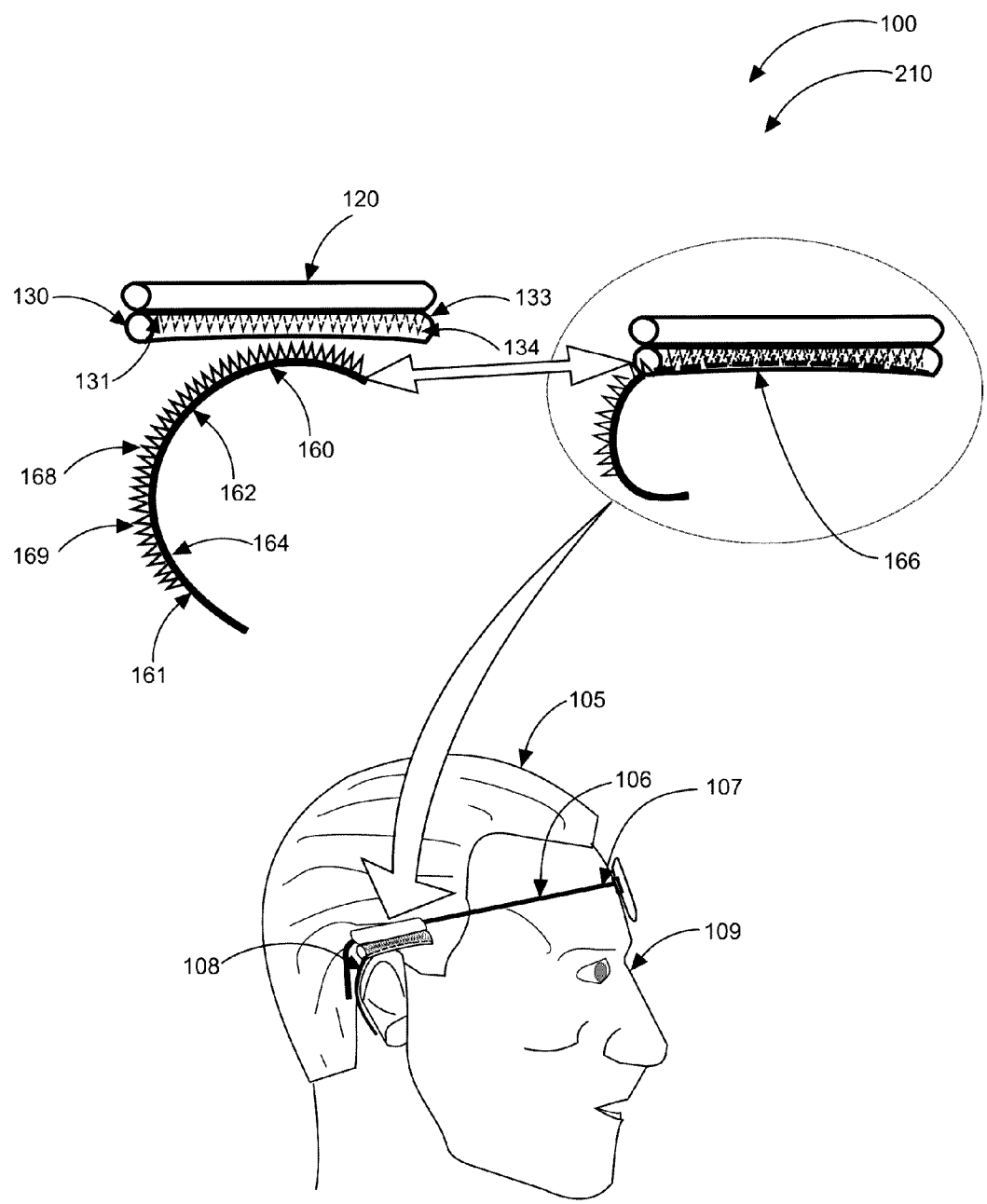
FIG. 3 is a perspective view illustrating a glider eyeglass comfort system in an in-use condition according to an embodiment of the present invention of FIG. 1.

Referring now to FIG. 3, a perspective view illustrating glider eyeglass comfort system 100 in an in-use 150 condition according to an embodiment of the present invention of FIG. 1.

Glider-comfort-assemblies 110 are able to be adjusted on (respective) ears 108 of user 105 to effectively remove all of the weight of eyeglasses 107 from nose 109 of user 105 by adjusting the meshing and alignment of each set of first-teeth 133 with each set of second-teeth 168. This adjustment is accomplished by tilting eyeglasses 107 upward allowing each set of first-teeth 133 to move backward on each set of second-teeth 168. User 105 is able to adjust the angle of eyeglasses 107 at any time by changing the alignment of each set of first-teeth 133 with each set of second-teeth 168.

Figure 4:
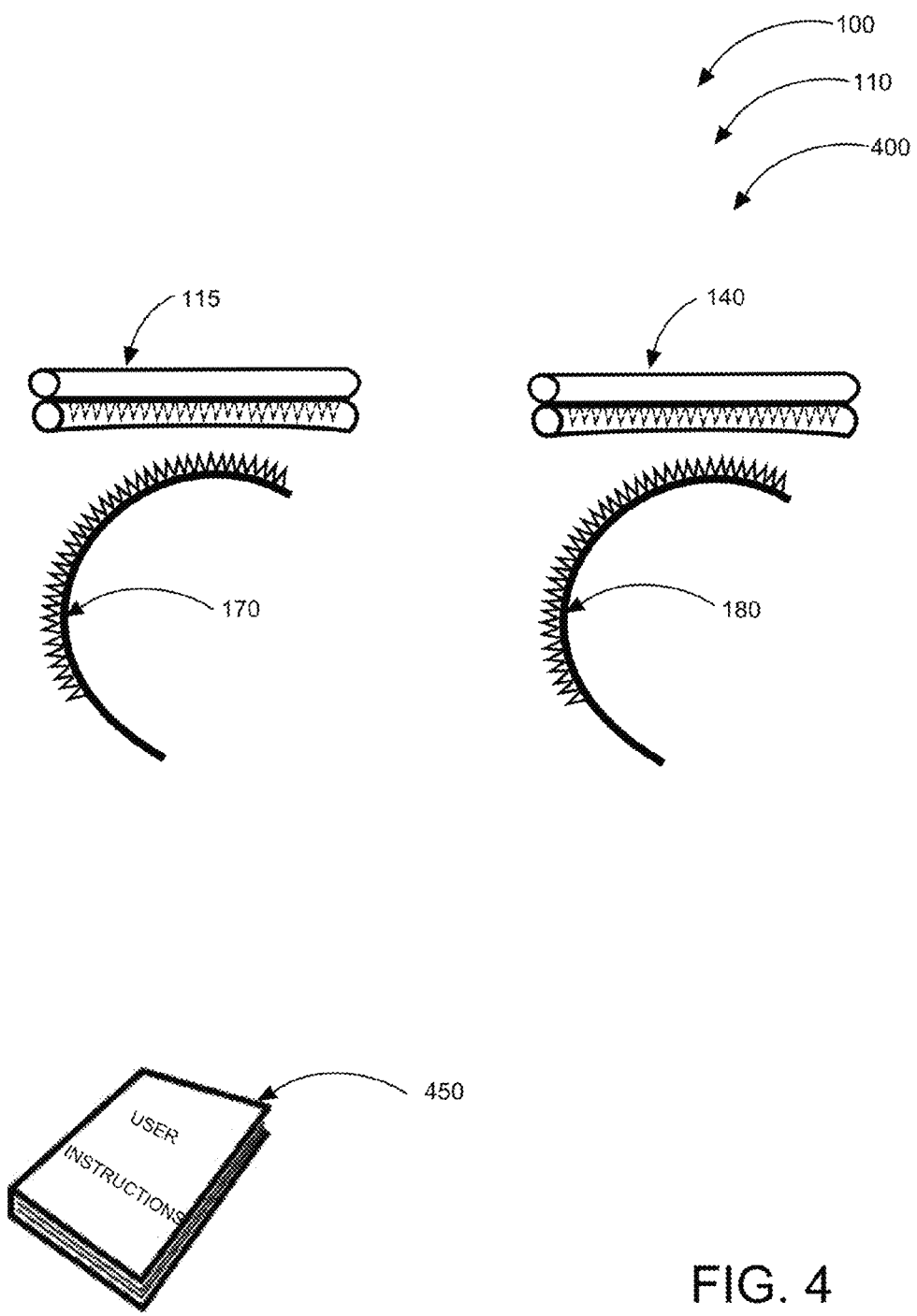
FIG. 4 is shows the glider eyeglass comfort system.

Referring now to FIG. 4, showing glider eyeglass comfort system 100 may be sold as kit 400 comprising the following parts: at least one first-glider-comfort-assembly 115; at least one second-glider-comfort-assembly 140; at least one first arcuate-male-adjustment-member 170; at least one second arcuate-male-adjustment-member 180; and at least one set of user instructions 450. The kit has instructions such that functional relationships are detailed in relation to the structure of the invention (such that the invention can be used, maintained, or the like in a preferred manner). Glider eyeglass comfort system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
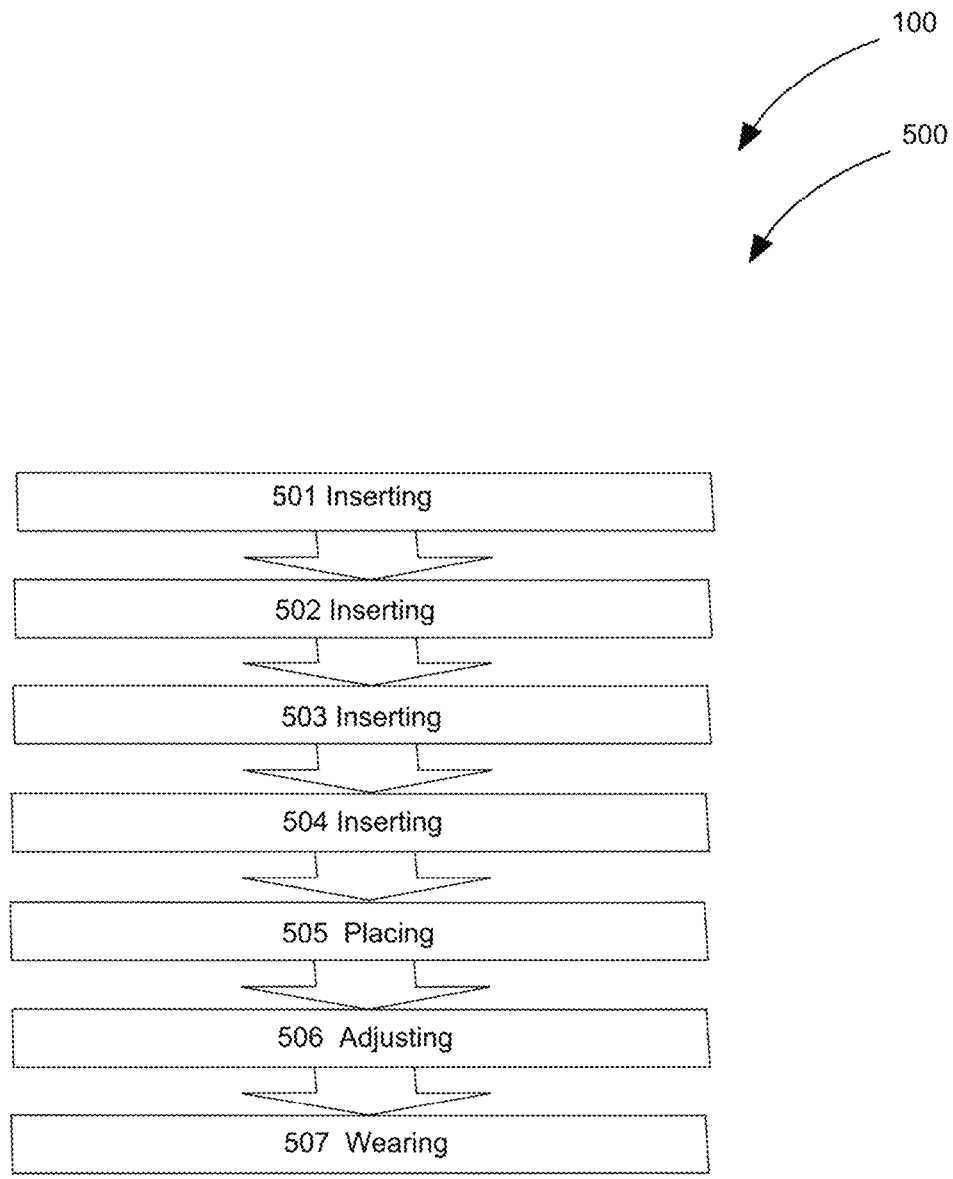
FIG. 5 is a flowchart illustrating a method of use for a glider eyeglass comfort system according to an embodiment of the present invention of FIGS. 1-4.

Referring now to FIG. 5, a flowchart illustrating a method of use 500 for glider eyeglass comfort system 100 according to an embodiment of the present invention of FIGS. 1-4.

A method of use 500 for glider eyeglass comfort system 100 may comprise the steps of: step one 501 inserting a first temple-piece 106 of pair of eyeglasses 107 via temple-piece-receiver 120; step two 502 inserting a second temple-piece 106 of pair of eyeglasses 107 via temple-piece-receiver 120; step three 503 inserting first-arcuate-male-adjustment-member 170 into arcuate-female-receiver 130 of first-glider-comfort-assembly 115; step four 504 inserting second-arcuate-male-adjustment-member 180 into arcuate-female-receiver 130 of second-glider-comfort-assembly 140; step five 505 placing pair of eyeglasses 107 on a head of user 105; step six 506 adjusting alignment of pair of eyeglasses 107 via adjusting first-arcuate-male-adjustment-member 170 and second-arcuate-male-adjustment-member 180 via manipulating set of second-teeth 168 on each arcuate-male-adjustment-member 160 with set of first-teeth 133 on each of arcuate-female-receiver 130; and step seven 507 wearing said pair of eyeglasses.

It should be noted that the steps described in the method of use can be carried out in many different orders according to user preference. The use of "step of" should not be interpreted as "step for", in the claims herein and is not intended to invoke the provisions of 35 U.S.C. §112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A glider eyeglass comfort system comprising:
   a pair of glider-comfort-assemblies, each said glider-comfort-assembly having:
      a temple-piece-receiver; and
      an arcuate-female-receiver; and
   a pair of arcuate-male-adjustment-members;
   wherein said glider eyeglass comfort system comprises said pair of glider-comfort-assemblies and said pair of structurally arranged arcuate-male-adjustment-members;
   wherein each said glider-comfort-assembly structurally arranged comprises said temple-piece-receiver and said arcuate-female-receiver;
   wherein each of said pair of glider-comfort-assemblies is able to be removably attached to a pair of eyeglasses via temple-pieces of said eyeglasses being inserted into said temple-piece-receivers;
   wherein each of said arcuate-female-receivers comprises a set of first-teeth and each of said pair of arcuate-male-adjustment-members comprises a set of second-teeth;
   wherein each of said arcuate-male-adjustment-members is able to be removably placed adjacent an ear of a user;
   wherein each of said arcuate-female-receivers adjustably receives each of said pair of arcuate-male-adjustment-members, respectively, as said user is able to adjust each of said arcuate-male-adjustment-members about a respective said ear of said user;
   wherein each said set of first-teeth is able to interact and align with each said set of second-teeth to provide arcuate adjustment; and
   wherein said user is able to removably place a respective said temple-piece-receivers on each respective said temple-pieces of said eyeglasses via said temple-piece-receiver, place each of said pair of arcuate-male-adjustment-members into each respective said arcuate-female-receiver, place each of said arcuate-male-adjustment-members on respective said ears of said user allowing said user to manipulately align said first-teeth and said second-teeth to relieve pressure of a nose-piece of said eyeglasses on a nose of said user by shifting weight of said eyeglasses to said ears of said user as desired.

2. The glider eyeglass comfort system of claim 1 wherein said pair of glider-comfort-assemblies comprises a first-glider-comfort-assembly and a second-glider-comfort-assembly.

3. The glider eyeglass comfort system of claim 2 wherein said first-glider-comfort-assembly and said second-glider-comfort-assembly comprise soft pliable clear material able to allow each of said temple-pieces of said eyeglasses to be inserted into and through said temple-piece-receiver of said first-glider-comfort-assembly and said temple-piece-receiver of said second-glider-comfort-assembly.

4. The glider eyeglass comfort system of claim 3 wherein said first-glider-comfort-assembly and said second-glider-comfort-assembly each comprise a length sufficient for stabilizing said glider-comfort-assembly on each of said temple-pieces of said eyeglasses when said glider-comfort-assembly is in use and a glider-height sufficient for containing said temple-piece-receiver and said arcuate-female-receiver.

5. The glider eyeglass comfort system of claim 3 wherein each of said first-glider-comfort-assembly and said second-glider-comfort-assembly is able to be adjusted on each of said temple-pieces of said eyeglasses by independently sliding said first-glider-comfort-assembly and said second-glider-comfort-assembly forward and backward via said temple-piece-receivers on said temple-pieces of said eyeglasses.

6. The glider eyeglass comfort system of claim 1 wherein said set of first-teeth comprise a plurality of approximately twenty-four said first-teeth.

7. The glider eyeglass comfort system of claim 6 wherein each of said set of first-teeth comprising soft flexible material is fixedly attached to an inside-top-edge of said arcuate-female-receiver of said first-glider-comfort-assembly and said inside-top-edge of said arcuate-female-receiver of said second-glider-comfort-assembly.

8. The glider eyeglass comfort system of claim 7 wherein each of said first-teeth are evenly spaced along a length of said arcuate-female-receiver of said first-glider-comfortassembly and said length of said arcuate-female-receiver of said second-glider-comfort-assembly.

9. The glider eyeglass comfort system of claim 1 wherein each of said pair of arcuate-male-adjustment-members comprise a substantially semi-circle curvature able to fit snugly around each of said ears of said user at a juncture between said ears and a scalp of said user.

10. The glider eyeglass comfort system of claim 9 wherein each of said arcuate-male-adjustment-members is able to be inserted into each of said arcuate-female-receivers.

11. The glider eyeglass comfort system of claim 10 wherein each of said pair of arcuate-male-adjustment-members comprise light-weight clear plastic flexible material of sufficient flexibility for a section of each said arcuate-male-adjustment-member to substantially straighten out as each of said arcuate-male-adjustment-members is inserted into each of said arcuate-female-receivers.

12. The glider eyeglass comfort system of claim 9 wherein said pair of arcuate-male-adjustment-members comprise a first-arcuate-male-adjustment-member and a second-arcuate-male-adjustment-member.

13. The glider eyeglass comfort system of claim 12 wherein said first-arcuate-male-adjustment-member and said second-arcuate-male-adjustment-member each comprise a diameter of approximately two inches.

14. The glider eyeglass comfort system of claim 13 wherein said eyeglasses are able to be placed on a head of said user and adjusted by manipulating said eyeglasses via meshing each of said set of first-teeth with each of said set of second-teeth to achieve a degree of angle desired by said user said eyeglasses.

15. The glider eyeglass comfort system of claim 1 wherein said set of second-teeth comprise a plurality of approximately forty said second-teeth to allow incremental adjustment means.

16. The glider eyeglass comfort system of claim 15 wherein each of said set of second-teeth comprising soft flexible material is fixedly attached to a top-edge of said first-arcuate-male-adjustment-member and said top-edge of said second-arcuate-male-adjustment-member.

17. The glider eyeglass comfort system of claim 16 wherein each of said second-teeth are evenly spaced along said length of said top-edge of said first-arcuate-male-adjustment-member and along said length of said top-edge of said second-arcuate-male-adjustment-member.

18. A glider eyeglass comfort system comprising:
a pair of glider-comfort-assemblies, each said glider-comfort-assembly having:
a temple-piece-receiver; and
an arcuate-female-receiver; and
a pair of arcuate-male-adjustment-members;
wherein said glider eyeglass comfort system comprises said pair of glider-comfort-assemblies and said pair of structurally arranged arcuate-male-adjustment-members;
wherein each said glider-comfort-assembly structurally arranged comprises said temple-piece-receiver and said arcuate-female-receiver;
wherein said pair of glider-comfort-assemblies comprises a first-glider-comfort-assembly and a second-glider-comfort-assembly;
wherein said first-glider-comfort-assembly and said second-glider-comfort-assembly comprise soft pliable clear material able to allow each of said temple-pieces of said eyeglasses to be inserted into and through said temple-piece-receiver of said first-glider-comfort-assembly and said temple-piece-receiver of said second-glider-comfort-assembly;
wherein said first-glider-comfort-assembly and said second-glider-comfort-assembly each comprise a length sufficient for stabilizing said glider-comfort-assembly on each of said temple-pieces of said eyeglasses when said glider-comfort-assembly is in use and a glider-height sufficient for containing said temple-piece-receiver and said arcuate-female-receiver;
wherein each of said pair of glider-comfort-assemblies is able to be removably attached to a pair of eyeglasses via temple-pieces of said eyeglasses being inserted into said temple-piece-receivers;
wherein each of said first-glider-comfort-assembly and said second-glider-comfort-assembly is able to be adjusted on each of said temple-pieces of said eyeglasses by independently sliding said first-glider-comfort-assembly and said second-glider-comfort-assembly forward and backward via said temple-piece-receivers on said temple-pieces of said eyeglasses;
wherein each of said arcuate-female-receivers comprises a set of first-teeth and each of said pair of arcuate-male-adjustment-members comprises a set of second-teeth;
wherein said set of first-teeth comprise a plurality of approximately twenty-four said first-teeth;
wherein each of said first-teeth are evenly spaced along a length of said arcuate-female-receiver of said first-glider-comfort-assembly and said length of said arcuate-female-receiver of said second-glider-comfort-assembly;
wherein each of said set of first-teeth comprising soft flexible material is fixedly attached to an inside-top-edge of said arcuate-female-receiver of said first-glider-comfort-assembly and said inside-top-edge of said arcuate-female-receiver of said second-glider-comfort-assembly;
wherein said set of second-teeth comprise a plurality of approximately forty said second-teeth to allow incremental adjustment means;
wherein each of said second-teeth are evenly spaced along said length of said top-edge of said first-arcuate-male-adjustment-member and along said length of said top-edge of said second-arcuate-male-adjustment-member;
wherein each of said set of second-teeth comprising soft flexible material is fixedly attached to a top-edge of said first-arcuate-male-adjustment-member and said top-edge of said second-arcuate-male-adjustment-member;
wherein each of said arcuate-male-adjustment-members is able to be removably placed adjacent an ear of a user;
wherein said pair of arcuate-male-adjustment-members comprise a first-arcuate-male-adjustment-member and a second-arcuate-male-adjustment-member;
wherein each of said pair of arcuate-male-adjustment-members comprise a substantially semi-circle curvature able to fit snugly around each of said ears of said user at a juncture between said ears and a scalp of said user;
wherein said first-arcuate-male-adjustment-member and said second-arcuate-male-adjustment-member each comprise a diameter of approximately two inches;
wherein each of said pair of arcuate-male-adjustment-members comprise light-weight clear plastic flexible material of sufficient flexibility for a section of each said arcuate-male-adjustment-member to substantially straighten out as each of said arcuate-male-adjustment-members is inserted into each of said arcuate-female-receivers;

wherein each of said arcuate-male-adjustment-members is able to be inserted into each of said arcuate-female-receivers;

wherein each of said arcuate-female-receivers adjustably receives each of said pair of arcuate-male-adjustment-members as said user is able to adjust each of said arcuate-male-adjustment-members about said ear of said user;

wherein each said set of first-teeth is able to interact and align with each said set of second-teeth to provide arcuate adjustment;

wherein said eyeglasses are able to be placed on a head of said user and adjusted by manipulating said eyeglasses via meshing each of said set of first-teeth with each of said set of second-teeth to achieve a degree of angle desired by said user for said eyeglasses; and wherein said user is able to removably place each of said temple-piece-receivers on each of said temple-pieces of said eyeglasses via said temple-piece-receiver, place each of said pair of arcuate-male-adjustment-members into each of said arcuate-female-receivers, place each of said arcuate-male-adjustment-members on respective said ears of said user allowing said user to manipulately align said first-teeth and said second-teeth to relieve pressure of a nose-piece of said eyeglasses on a nose of said user by shifting weight of said eyeglasses to said ears of said user as desired.

19. The glider eyeglass comfort system of claim 18 comprising a kit including: at least one said pair of glider-comfort-assemblies, each of said pair of glider-comfort-assemblies having said temple-piece-receiver and said arcuate-female-receiver having said set of first-teeth; at least one pair of said arcuate-male-adjustment-members having said set of second-teeth; and at least one set of user instructions.

20. A method of use for a glider eyeglass comfort system comprising the steps of:
inserting a first temple-piece of a pair of eyeglasses into a first-glider-comfort-assembly via a first a temple-piece-receiver;
inserting a second said temple-piece of said pair of eyeglasses into a second-glider-comfort-assembly via a second temple-piece-receiver;
inserting a first-arcuate-male-adjustment-member into an arcuate-female-receiver of said first-glider-comfort-assembly;
inserting a second-arcuate-male-adjustment-member into an arcuate-female-receiver of second-glider-comfort-assembly;
placing said pair of eyeglasses on a head of a user;
adjusting alignment of said pair of eyeglasses via adjusting said first-arcuate-male-adjustment-member and said second-arcuate-male-adjustment-member via manipulating set of second-teeth on each arcuate-male-adjustment-member with set of first-teeth on each of said arcuate-female-receiver; and
wearing said pair of eyeglasses.

\* \* \* \* \*